H. G. LEE.
AUTOMATIC STOKER.
APPLICATION FILED MAY 14, 1917.

1,311,524.

Patented July 29, 1919.
5 SHEETS—SHEET 1.

Inventor

Harry G. Lee

By P. J. Elliott

Attorney

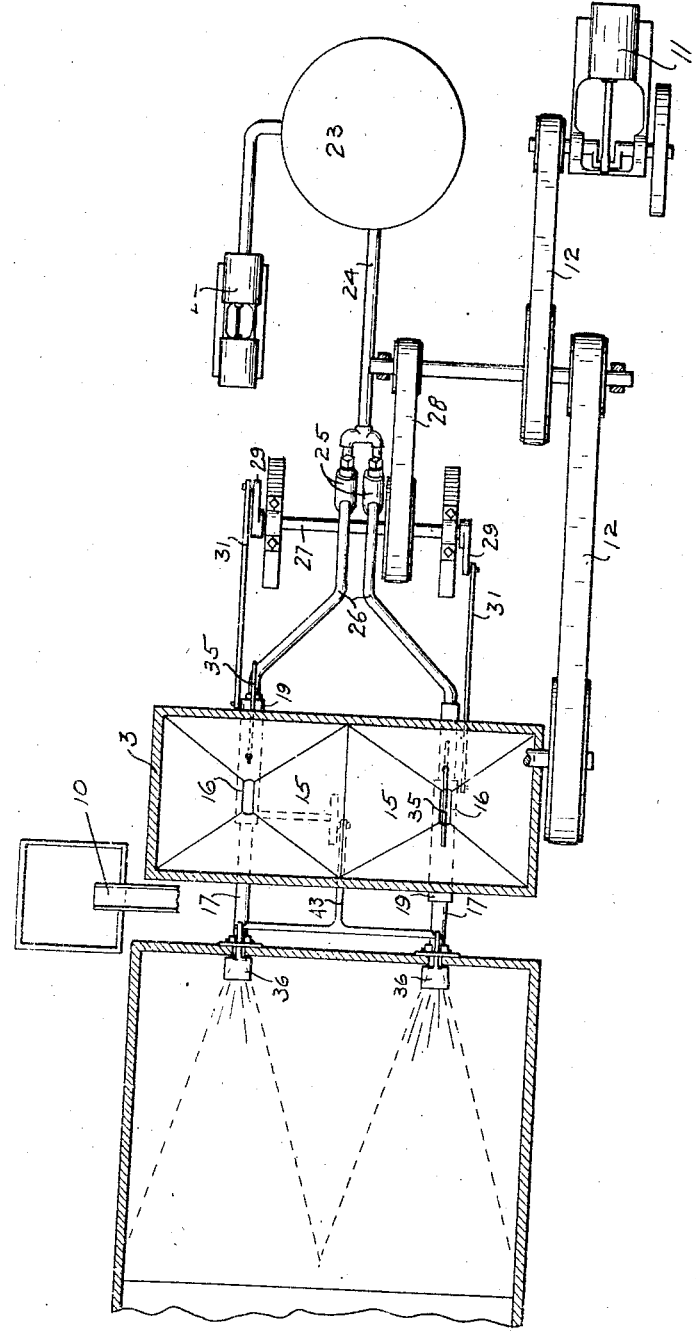

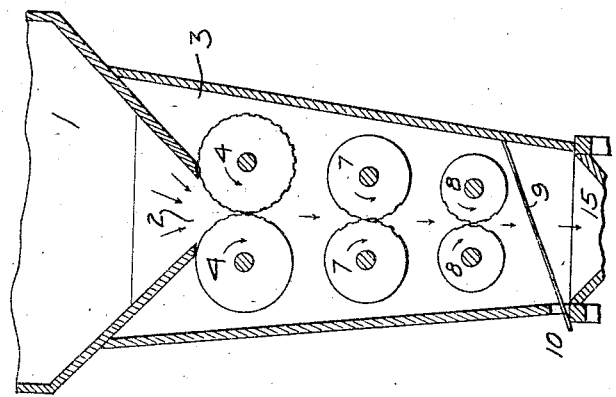
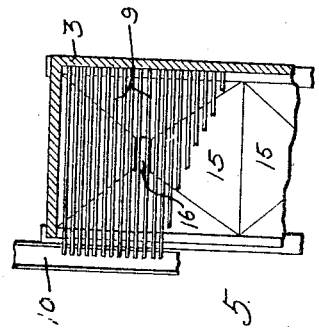
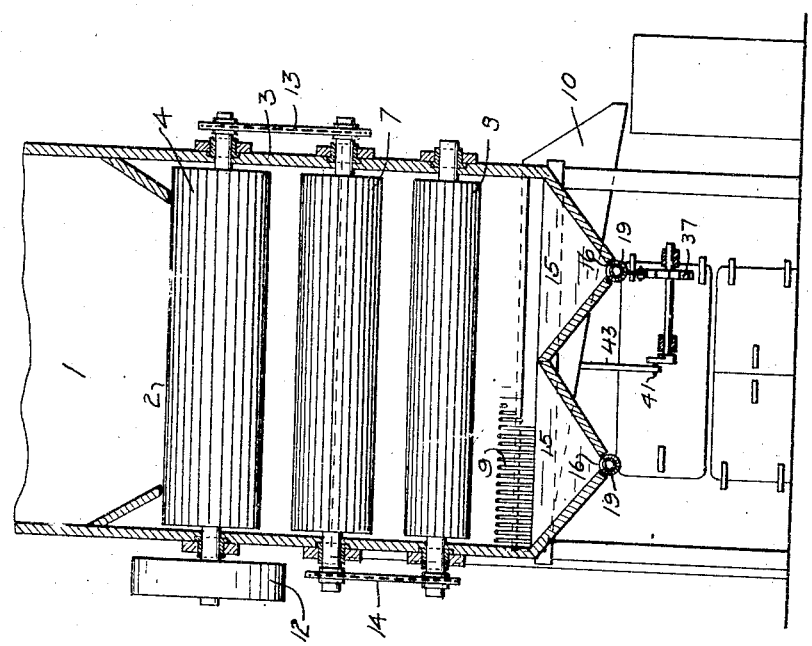

H. G. LEE.
AUTOMATIC STOKER.
APPLICATION FILED MAY 14, 1917.
1,311,524.
Patented July 29, 1919.
5 SHEETS—SHEET 4.
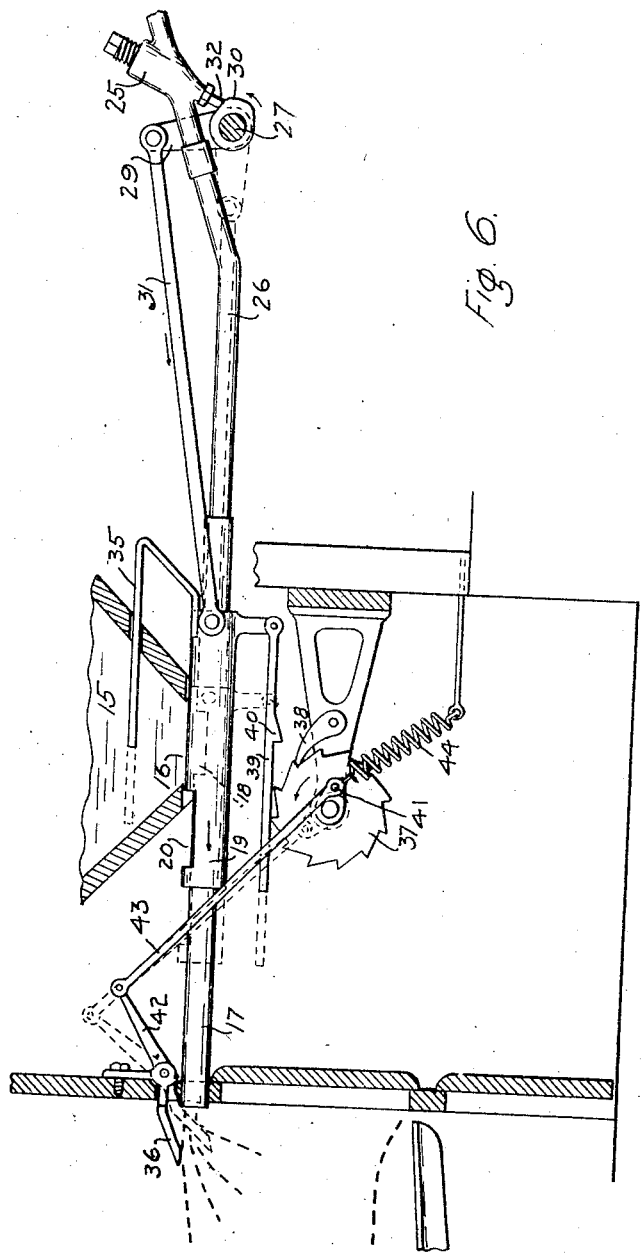
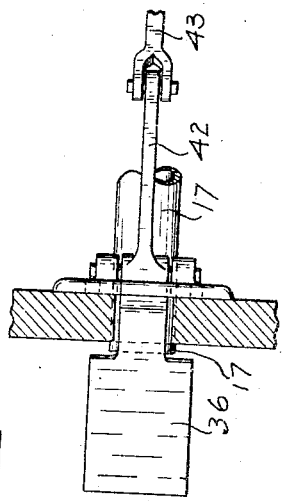
Inventor
Harry G. Lee
By R. S. Elliott
Attorney

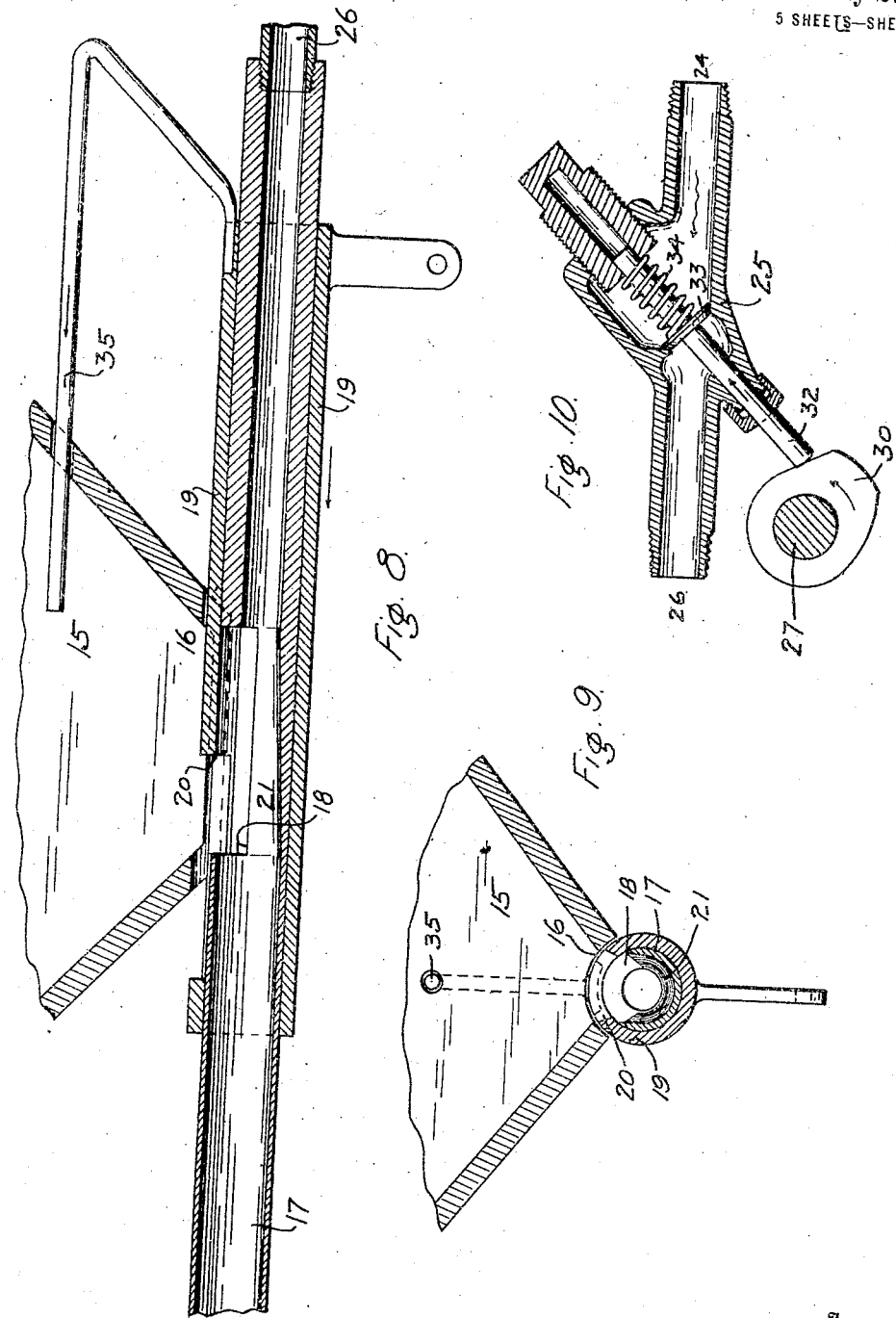

UNITED STATES PATENT OFFICE.

HARRY G. LEE, OF TACOMA, WASHINGTON, ASSIGNOR OF ONE-HALF TO ARTHUR G. PRICHARD, OF TACOMA, WASHINGTON.

AUTOMATIC STOKER.

1,311,524. Specification of Letters Patent. Patented July 29, 1919.

Application filed May 14, 1917. Serial No. 168,335.

*To all whom it may concern:*

Be it known that I, HARRY G. LEE, a citizen of the United States, residing at Tacoma, in the county of Pierce, State of Washington, have invented certain new and useful Improvements in Automatic Stokers, of which the following is a specification.

This invention relates to devices for continuously supplying the fire box of a boiler with fuel and has for its objects to provide means for preparing the fuel for the boiler; for separating unsuitable substances from the fuel; for conveying the fuel to the fire box; for distributing it evenly on the fire bed; and for preventing the clogging of the fuel in the hopper and passages. A further object is to provide mechanism whereby the action of the parts of the machine is coördinated to insure the best results.

I attain these and other objects by the devices, mechanisms and arrangements illustrated in the accompanying drawings, in which—

Fig. 2 is a plan thereof, partly in section;

Fig. 3 is a vertical cross-section of the machine;

Fig. 4 is a vertical longitudinal section of the fuel hopper;

Fig. 5 is a plan of a part of the screen;

Fig. 6 is a vertical longitudinal section of the lower part of the hopper and the operating portions of the machine;

Fig. 7 is a plan showing the fuel deflector;

Fig. 8 is an enlarged longitudinal section of the lower part of the hopper and the fuel delivery mechanism therein;

Fig. 9 is a vertical cross-section thereof; and

Fig. 10 is a longitudinal section of the air valve.

Similar numerals of reference refer to similar parts throughout the several views.

Figure 1:
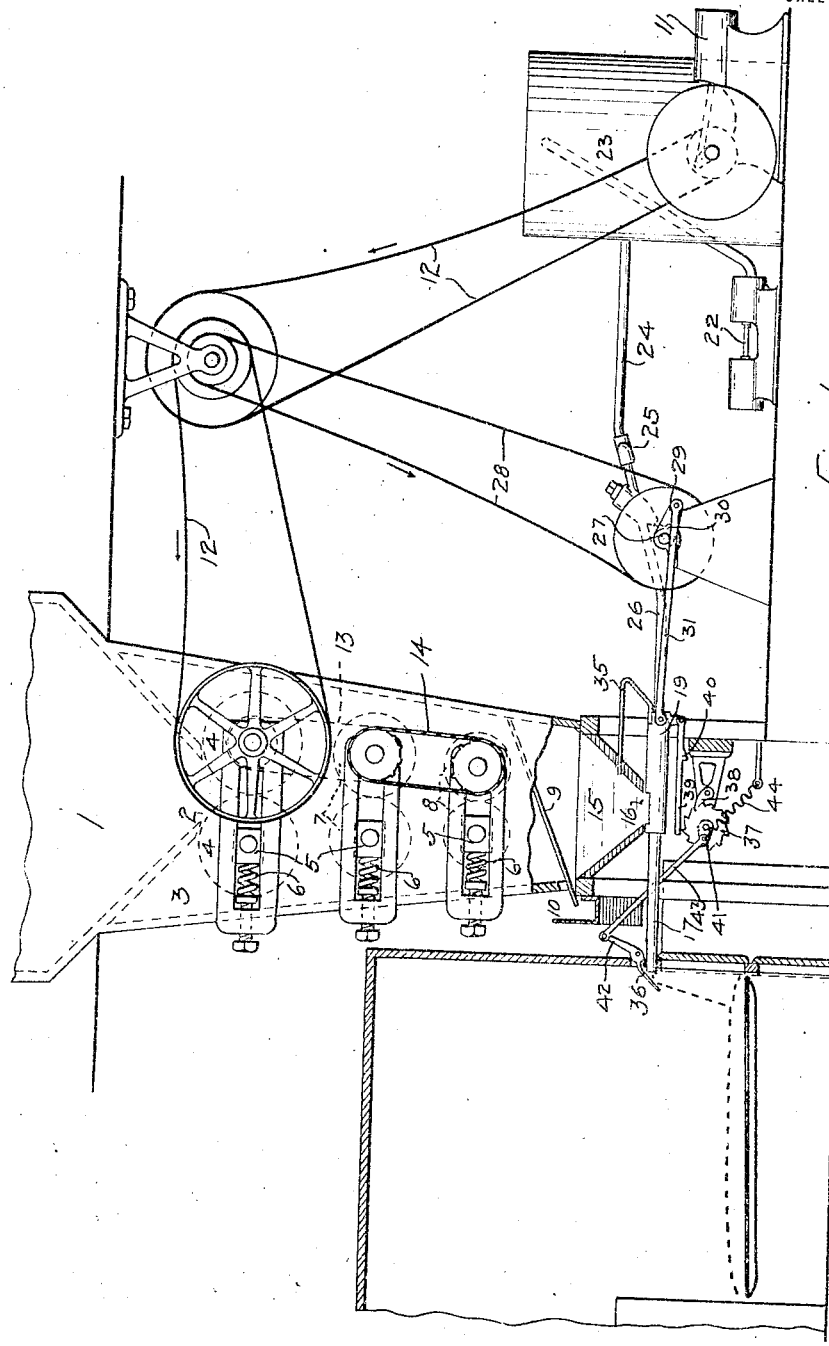
Figure 1 is a side elevation of my improved machine, a portion thereof being broken away to reveal the interior thereof.

This machine consists of a coal crushing plant; an air compressor; a coal valve admitting a measured quantity of coal to the air blast passage; an air valve suddenly admitting air to said passage to blast the coal therefrom into the furnace; connected mechanism whereby the action of the air valve and coal valve are coördinated; a deflector within the furnace and adapted to cause successive blasts of coal to reach different portions of the fire bed; and power means whereby the mechanisms are operated.

Referring to the drawings, the coal is delivered to the main hopper 1 which has the usual inclined bottom leading to an outlet hole 2 connecting the hopper to the coal crushing box or chute 3. A pair of large crushing rolls 4 are mounted immediately below the outlet 2 and within the crushing chute 3 and are rotated so that their adjacent faces move downward. One of these rolls 4 is mounted in sliding bearing blocks 5, said blocks being pressed toward the other roll 4 by a suitable spring 6, so that if a hard rock is mixed in the coal it will pass the said pair of rolls 4 by forcing the roll having sliding bearing blocks 5 away from the other roll and against the action of the springs 6 thereof. A second pair of rolls 7 are similarly mounted in the box 3 immediately below the rolls 4 and are rotated in the same direction as said rolls 4, the second pair 7 being of somewhat smaller diameter than the first pair 4. A third pair of rolls 8, again of smaller diameter than said rolls 7, are similarly mounted in the box 3 immediately below the said second rolls 7 and are rotated in the same direction. The rolls 4, 7 and 8 are preferably corrugated so as to have a crushing action on the coal passing between them. It is evident that coal fed from the hopper 1 will pass through the opening 2 and will be crushed between the successive pairs of rolls to the required degree of fineness and that hard rock will pass the rolls without being broken to the same extent. Immediately below the lowest pair of rolls 8 I have mounted an inclined screen consisting of parallel bars 9, preferably of circular cross-section, and spaced such distance apart as to permit the crushed coal to pass between them readily but so as to catch the rocky pieces and cause them to slide down the screen and into the refuse chute 10 into which the screen bars 9 lead. The rolls 4, 7 and 8 are driven by a suitable engine 11 through suitable belting 12. One roll of each pair is driven, the other roll of the pair rotating by the friction with the driven roll and with the moving coal. The belting 12 connects to the upper roll 4, and this roll drives the roll 7 by means of a sprocket chain 13, and the roll 7 drives the roll 8 by means of a second sprocket chain 14.

That portion of the box 3 below the level of the screen bars 9 is formed into one or more small hoppers 15 each having converging sides and a narrow opening 16 in the bottom. A coal delivery pipe 17 is mounted below the opening 16 in each hopper 15 and has a slot 18 in its upper surface to permit the coal from the hopper to fall into the interior of the pipe. A sleeve 19 surrounds the said pipe 17 and slides thereon, said sleeve having a corresponding slot 20 in its upper surface to permit the passage therethrough of the said coal passing from the hopper 15 to the interior of the pipe 17. When the sleeve 19 is pushed to the left (Fig. 8) it closes the connection between the hopper and the pipe by closing the slot 18 in the pipe, and when it is pushed to the right it opens such communication because the slot 20 then lies directly over the slot 18 in the pipe. The sleeve therefore forms a coal valve.

That portion 21 of the interior of the pipe 17 immediately below the slot 18 is made with diverging sides, or of increasing diameter, so as to form a coal cavity or chamber of such shape as to prevent the clogging of the coal therein. An air compressor 22 keeps a tank 23 charged with air under the desired pressure and a pipe 24 leads therefrom to the air valve 25. A pipe 26 leads from the air valve 25 to the coal delivery pipe 17, and this pipe 17 leads into the furnace. The valve 25 is suddenly opened by a cam, as hereinafter described, and permits the air, under high pressure, to pass to the pipe 17 and, since at this time the chamber 21 is full of coal and the coal valve is closed, the blast of air drives the coal from the chamber 21 into the furnace.

The engine 11 also runs a suitably mounted control shaft 27, by means of belting 28 and this shaft is provided with a crank 29 and a cam 30 for each coal delivery pipe 17. The crank 29 is connected to the sleeve 19 by the connecting rod 31 and reciprocates it to open and close the coal valve, as above described. The cam 30 is shaped and positioned to engage the valve spindle 32 of the air valve 25 and to raise the valve disk 33 suddenly from the valve seat and thus to cause a sudden blast of compressed air to pass to the coal delivery pipe 17. A spring 34 engages the disk 33 to insure its being closed at all times when the cam does not engage the spindle. The relative positions of the crank 29 and the cam 30 are such that when the coal valve is open to admit coal into the chamber 21 of the pipe 17 the air valve 25 is closed, and so that when the air valve 25 is open to blast the coal into the furnace the coal valve is closed to prevent the air from passing out of the slot 18 thereof.

In order to prevent the coal in the small hoppers 15 from arching across the openings 16 and thus stop the feeding of the coal to the device, I attach a rod 35 to the sleeve 19, said rod passing through a hole in the side of the hopper 15 and moving with the sleeve, so that this rod will disturb the coal in the hopper and will break up any tendency to arch across the opening 16.

In order to prevent the blast of coal from always falling on the same portion of the fire bed I mount a deflector plate 36 within the furnace and adjacent the orifice of the coal delivery pipe 17, said plate 36 being mounted on a horizontal pivot and being adjustably held in line with the blast so that the coal in the blast is deflected from its normal course to greater or less extent according to the adjustment of the said plate 36. The adjustment of this plate 36 is accomplished automatically and intermittently by the following mechanism: A ratchet wheel 37 is rotatably mounted below the sleeve 19 and is held from rotation backward by a suitable dog 38 mounted near it and engaging the teeth. A driving dog 39 is mounted on the sleeve 19 and has a tooth 40 adapted to engage the tooth of the wheel 37 when the sleeve 19 is near the inner or left end of its stroke, so that as it passes to the said end of its stroke it moves the ratchet wheel 37 through a distance corresponding with one tooth. A crank pin 41 is attached to the ratchet wheel and is connected to the lever arm 42 of the deflector plate 36 by a rod 43, so that as the ratchet wheel turns it causes the plate 36 to turn on its pivot and presents a different angle to the motion of the coal blast. A spring 44 is attached to the crank pin 41 and to the frame so that as the wheel turns it draws the spring 44 out until the plate 36 has reached its point of greatest movement downward when the spring is stretched to its greatest extent and any further movement of the wheel 37 carries it past the dead center and the spring then immediately turns the wheel through one-half a revolution thus quickly raising the deflector plate 36 to its highest or starting point and causing the next blast to travel unhindered to the fire bed. Thus each successive blast will be deflected more and more and will reach the fire bed nearer and nearer to the door until the extreme position is reached when the next blast will begin the action over again. This will prevent overlapping of fuel charges delivered to the fire-bed and will insure uniform distribution of the fuel over the same. The plate 36 is moved by the above described mechanism when no blast is passing.

Having described my invention, what I claim is:

1. In a mechanical stoker, a fuel pipe having a lateral fuel opening, a valve slidable on the pipe for closing the fuel opening thereof and completing the pipe, said pipe forming a straight barrel from the charge receiving portion to its discharge end, means for delivering a fuel feeding blast through the pipe at a point in rear of the charge, a valve for cutting off the blast and means for positively operating the valves in alternation to cut off the blast when the fuel is feeding to the pipe and to cut off the supply of fuel to the pipe when the blast is forcing the fuel charge from the pipe.

2. In a mechanical stoker, a fuel pipe having a lateral fuel opening, a valve slidable on the pipe for closing the fuel opening thereof, means for delivering a fuel feeding blast through the pipe, a valve for cutting off the blast, means for positively operating the valves, and a fuel agitator connected with the fuel valve and actuated thereby.

3. In a mechanical stoker, a fuel pipe forming a straight barrel, means for holding a supply of fuel communicating with the barrel for supplying a charge of fuel to the same, means for closing such communication, and means for introducing an expansive medium into the barrel in rear of the fuel whereby the charge is instantaneously blown into the furnace.

4. In a mechanical stoker, a hopper, a pipe leading to the furnace and having a lateral opening to receive fuel from the hopper, a valve slidable on the pipe over the opening thereof, an agitator operable in the hopper and connected with the valve, and means for delivering a fuel feeding blast through the pipe.

5. In a mechanical stoker, a movable deflector for distributing the fuel over the fuel bed, a rotary member, connecting means between the rotary member and the deflector having crank connection with the said rotary member for vibrating the deflector, a ratchet mechanism for advancing the rotary member, yieldable means normally tending to move the rotary member backward and a detent for preventing backward movement of the rotary member during its advance to a dead center position and admitting of a quick forward movement of the rotary member after the same has passed the dead center to return the deflector quickly to normal position after it has reached the limit of its movement in one direction.

6. In a machine of the class described, the combination with a coal hopper having an outlet; a coal valve in said outlet; a coal delivery pipe having an inlet slot connecting with the outlet in the hopper whereby the pipe is filled with coal when the coal valve is opened; a supply of compressed air connected to said coal delivery pipe and adapted to blow the coal therein out thereof; an air valve controlling the blast of air; mechanism connecting the coal valve with the air valve whereby their actions are coördinated whereby the air valve is closed when the coal valve is open and the coal valve is closed when the air valve is open; an adjustable deflector mounted in the line of the blast from the coal delivery pipe; and mechanism for adjusting said deflector into a series of successive positions and connected to and coördinated with said air valve mechanism whereby said deflector is adjusted when said air valve is closed and whereby successive blasts of coal are deflected to different portions of the furnace.

7. In a furnace stoker, a fuel pipe consisting of a straight barrel having a lateral opening, means for holding a supply of fuel communicating with the barrel at the lateral opening for supplying a charge of fuel to the said barrel, a slidable closure mounted on the barrel for closing such communication, and means for introducing an expansive medium into the barrel in rear of the fuel whereby the entire charge is instantaneously blown into the furnace.

8. A mechanical stoker including a hopper, a fuel discharge pipe communicating at a point intermediate its ends with the hopper, means for closing the discharge pipe and the hopper to define a charge of fuel within said pipe and to shut off the feed, said pipe forming a substantially straight barrel from the hopper to its discharge end, means for introducing fluid pressure into the pipe in rear of the charge of fuel to discharge the latter into a furnace, and means for alternately operating said means to cut off the said pressure when the fuel is feeding to the pipe and to cut off the supply of fuel to the pipe when the fuel pressure is forcing the charge from the pipe.

9. A fuel pipe consisting of a straight barrel having a lateral opening, means for holding a supply of fuel communicating with the barrel through the lateral opening for supplying a charge of fuel to the barrel, a sleeve slidably mounted on the barrel for closing such communication, and means for introducing an expansive medium into the barrel in rear of the fuel whereby the entire charge is instantaneously blown into the furnace.

10. A mechanical stoker including a hopper, a fuel discharge pipe provided intermediate of its ends with a lateral inlet communicating with the hopper, a sleeve mounted on the exterior of the discharge pipe to cover and uncover the said lateral inlet of the discharge pipe, the latter forming substantially a straight barrel from the hopper to its discharge end, a valve for introducing fluid pressure into the pipe in rear of the fluid pressure for discharging the latter, and means for operating the sleeve and the valve in alternation to cut off the fluid pressure when the fuel is feeding to the pipe and to cut off the supply of fuel to the pipe when the fluid pressure is forcing the fuel charge from the pipe.

11. A mechanical stoker including fuel discharging means, a distributer movable back and forth in the path of the fuel to deflect the same to different portions of a grate, a crank element connected with the distributer for actuating the same, means for rotating the crank element to impart a step by step movement to the distributer during one-half of a revolution of the crank element and while the distributer is traveling in one direction and for rapidly moving the crank element during the other half revolution while the distributer is traveling in the opposite direction to cause a quick return of the distributer to prevent overlapping of the fuel charges.

12. A mechanical stoker including fuel discharging means, a distributer movable back and forth in the path of the fuel to deflect the same to different portions of a grate, a crank element connected with the distributer for actuating the same, means for rotating the crank element to impart a step by step movement to the distributer during one-half of a revolution of the crank element and while the distributer is traveling in one direction, and a spring eccentrically connected with the crank element and adapted to be distended during the step by step movement and arranged to rapidly actuate the crank element during the other half revolution and while the distributer is traveling in the opposite direction to cause a quick return of the distributer to prevent overlapping of fuel charges.

13. A mechanical stoker including a fuel discharging means, a distributer movable back and forth in the path of the fuel to deflect the same to different portions of a grate, a crank element connected with the distributer for actuating the same, means comprising a ratchet wheel, a coacting pawl for rotating the crank element to impart a step by step movement to the distributer during one-half of a revolution of the crank element, and while the distributer is traveling in one direction, and a spring connected with the crank element and arranged to be distended during such movement of the said crank element and adapted for rapidly moving the same during the other half revolution while the distributer is traveling in the opposite direction to cause a quick return of the distributer to prevent overlapping of the fuel charges.

HARRY G. LEE.